(12) United States Patent
Jeong

(10) Patent No.: US 7,372,588 B1
(45) Date of Patent: May 13, 2008

(54) REDUCING A STANDBY PERIOD OF TIME FOR PRINTING

(75) Inventor: Yong-Tae Jeong, Kyonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 09/576,218

(22) Filed: May 22, 2000

(30) Foreign Application Priority Data

May 20, 1999 (KR) ............................... 1999-18172

(51) Int. Cl.
*G06F 15/00* (2006.01)
*G06K 1/00* (2006.01)

(52) U.S. Cl. .................. 358/1.15; 358/1.14; 709/229

(58) Field of Classification Search ................. 358/1.1, 358/1.9, 1.11–1.18; 709/229
See application file for complete search history.

(56) References Cited

U.S. PATENT DOCUMENTS

| | | | |
|---|---|---|---|
| 5,179,637 A | 1/1993 | Nardozzi | |
| 5,228,118 A | 7/1993 | Sasaki | |
| 5,287,194 A | 2/1994 | Lobiondo | |
| 5,580,177 A | 12/1996 | Gase et al. | |
| 5,940,582 A | 8/1999 | Akabori et al. | |
| 6,333,789 B1 * | 12/2001 | Shima | 358/1.15 |
| 6,459,496 B1 * | 10/2002 | Okazawa | 358/1.14 |
| 2002/0105671 A1 * | 8/2002 | Sugahara | 358/1.15 |

FOREIGN PATENT DOCUMENTS

JP 10116165 A * 5/1998

* cited by examiner

*Primary Examiner*—Gabriel I. Garcia
*Assistant Examiner*—Thierry L. Pham
(74) *Attorney, Agent, or Firm*—Robert E. Bushnell, Esq.

(57) ABSTRACT

Reducing a standby period of time for printing includes: registering at least one item of network print information in a host computer; detecting the network printer information registered in the host computer if a command for printing has been selected; transmitting a command for requesting the network printers to transmit information concerning the amount of standby print operations using detected network printer information; evaluating the received information concerning the amount of the standby print operations; detecting a network printer having the least amount of standby print operations and transmitting print data to the detected network printer.

16 Claims, 6 Drawing Sheets

| Priority number | IP address of network printer |
|---|---|
| 1 | 165. 213. 105. 88 |
| 2 | 165. 213. 105. 69 |
| 3 | 165. 213. 105. 70 |
| 4 | 165. 213. 105. 78 |
| 5 | 165. 213. 105. 54 |
| ⋮ | ⋮ |

Fig. 5

REDUCING A STANDBY PERIOD OF TIME FOR PRINTING

CLAIM OF PRIORITY

This application makes reference to, incorporates the same herein, and claims all benefits accruing under 35 U.S.C. §119 from the inventor's application METHOD FOR REDUCING A STANDBY PERIOD OF TIME FOR PRINTING filed with the Korean Industrial Property Office on 20 May 1999 and there duly assigned Serial No. 18172/1999.

BACKGROUND OF THE INVENTION

1. Field of the Invention

The present invention relates to reducing standby time for printers. More specifically, the invention concerns a method and system and program storage device for reducing standby time for printing in a set of networked printers.

2. Description of the Related Art

As known to those skilled in the art, a network is a communication structure in which two or more communication apparatuses are interconnected for the purpose of data communication and serves to transmit data between interconnected apparatuses. In this structure, transmitting and switching apparatuses as well as computers are interconnected by a communication line. Networks include the Internet, Local Area Networks (LANs) and Wide Area Networks (WANs). The Internet is a network in which networks are interconnected all over the world. LAN is a network in which communication apparatuses are interconnected in a local area. A WAN is a network in which communication apparatuses are interconnected in a wide area.

As computer networking technology developed and services using the technology increased, the operating systems for computers progressed to Network Operating System (NOS) and Distributed Operating System (DOS).

A printer is an apparatus that receives print data from data transmitting apparatuses such as personal computers and prints the print data in the form of a document. Printers include network printers and computer-connected printers. The former has a network card for allowing network communication to be possible.

When two or more network printers and at least one host computer are connected to a network, the user of the host computer may select one of the network printers and utilizes the selected network printer for a print operation. When a print operation is required to be performed for the host computer, print data are transmitted from the host computer to the selected network printer. The selected network printer performs the print operation using the print data that are transmitted from the host computer.

When there are a large amount of print operations in the selected network printer that received the print data, the selected network printer detects the network printer of the same type among the other network printers and relays the print data received from the host computer. The detected network printer performs the print operation using the print data that are transmitted from the host computer.

Exemplars of the art are Gase et al. U.S. Pat. No. 5,580,177 entitled PRINTER/CLIENT NETWORK WITH CENTRALLY UPDATED PRINTER DRIVERS AND PRINTER STATUS MONITORING; Lobiondo U.S. Pat. No. 5,287,194 entitled DISTRIBUTED PRINTING; Nardozzi U.S. Pat. No. 5,179,637 entitled METHOD AND APPARATUS FOR DISTRIBUTING PRINT JOBS AMONG A NETWORK OF IMAGE PROCESSORS AND PRINT ENGINES; Sasaki U.S. Pat. No. 5,228,118 entitled PRINTING SYSTEM WHEREIN ONE OF PRINTER DRIVERS THROUGH WHICH PRINT DATA IS SENT FROM A DATA PROCESSOR TO A PRINTER IS SELECTED BASED ON INTERPRETERS AVAILABLE ON THE PRINTER; and Akabori et al. U.S. Pat. No. 5,940,582 entitled DATA PRINTING SYSTEM AND METHOD, AND A CONTROLLER AND PRINTER THEREFOR.

The art has failed, however, to combine the instantaneous backlog of work distributed among network computers and to prioritize the assignment of forthcoming printing jobs on the basis of net distribution. Consequently, since a print operation must be performed in a network printer selected by a host computer in which the print operation is required to be performed even though one or more network printers are connected to a network, a standby period of time is lengthy when a large amount of print operations are in the selected network printer. Additionally, when a print operation is performed in such a way that a selected network printer relays print data to another network printer and the latter network printer performs the print operation using the print data, the efficiency and applicability of print operation suffers because only a network printer of the same type can be selected for this case.

SUMMARY OF THE INVENTION

Accordingly, the present invention is directed to solving the above problems occurring in the prior art. An object of the present invention is to provide a method and system which is capable of reducing a standby period of time for printing and a program storage device, readable by a machine, tangibly embodying a program of instructions executable by the machine to perform a method of reducing standby time for printing in a system of networked printers connected to at least one host computer. According to the present invention, when a host computer detects the amount of print operations in every networked one of a plurality of printers, it transmits print data to a network printer that has no pending print operation or else has the least amount of print operations, and causes the network printer to print the print data.

The present invention involves the registering at least one item of network print information in the host computer; detecting the network printer information registered in the host computer if a command for printing has been selected; transmitting a command for requesting the network printers to transmit information concerning the amount of standby print operations using detected network printer information; evaluating the information concerning the amount of the standby print operations transmitted from the network printers in response to the command for requesting the network printers to transmit information concerning the amount of standby print operations; determining a network printer having the least amount of standby print operations from among network printers having standby print operations; and transmitting print data to the so-detected network printer.

Preferably, the registration comprises determining whether the command for registering network printer information in the host computer has been selected, determining network printers connected to the network if the command for registering network printer information in the host computer has been selected, and storing the network printer information in a memory of the host computer.

Preferably, the method further comprises assigning priority numbers to the network printer information in the detected order, and storing assigned priority numbers together with the network printer information in the memory.

Preferably, the network printer information includes at least an IP (Internet Protocol) address of the registered network printer.

Preferably, the network print determining comprises determining priority numbers that have been assigned to the network printers having the least amount of standby print operations, and determining a network printer having a preferential priority number.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components.

FIG. 5 is a lookup table illustrating the network printer information registered in the host computer is accordance with the procedure of FIG. 3.

DETAILED DESCRIPTION

In the following, an embodiment of the present invention is described in detail with reference to the accompanying drawings.

Figure 1:
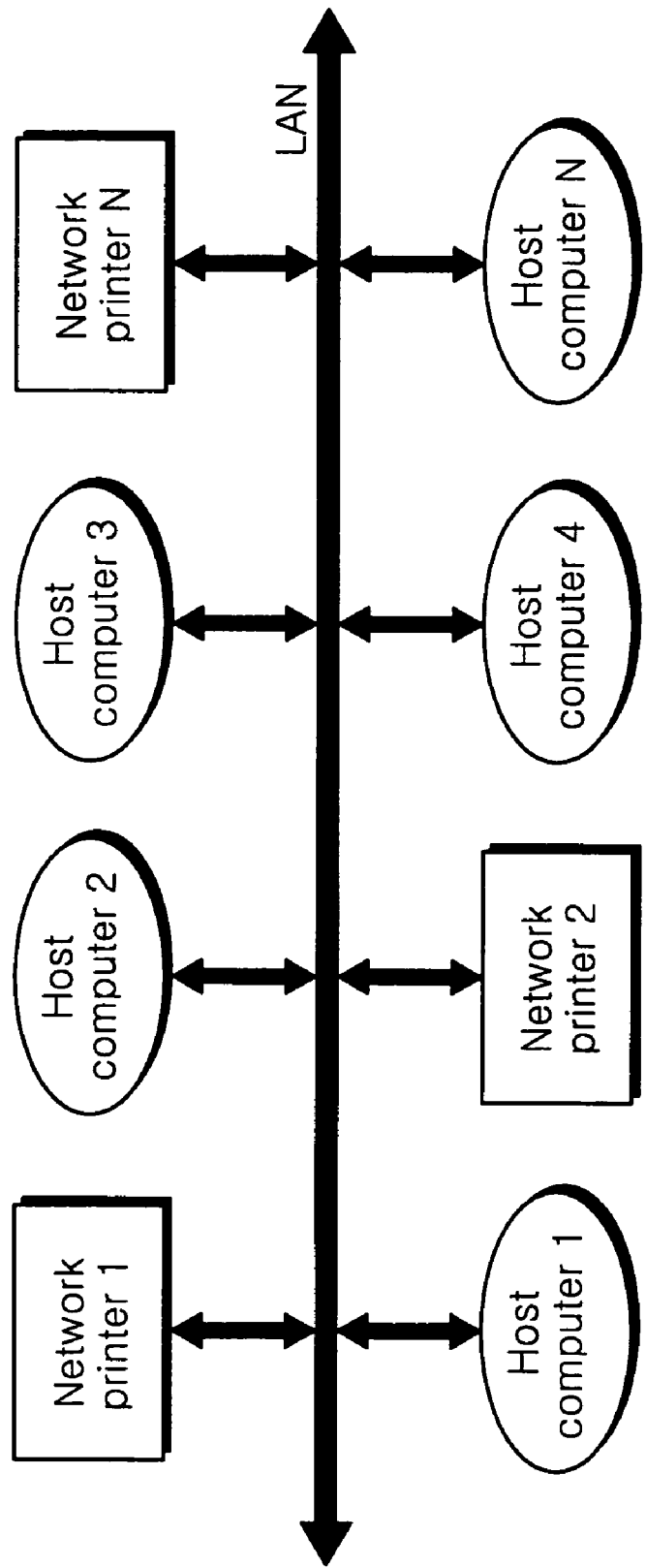
FIG. 1 is a schematic diagram in which the connection among a plurality of host computers and network printers is illustrated.
Figure 2:
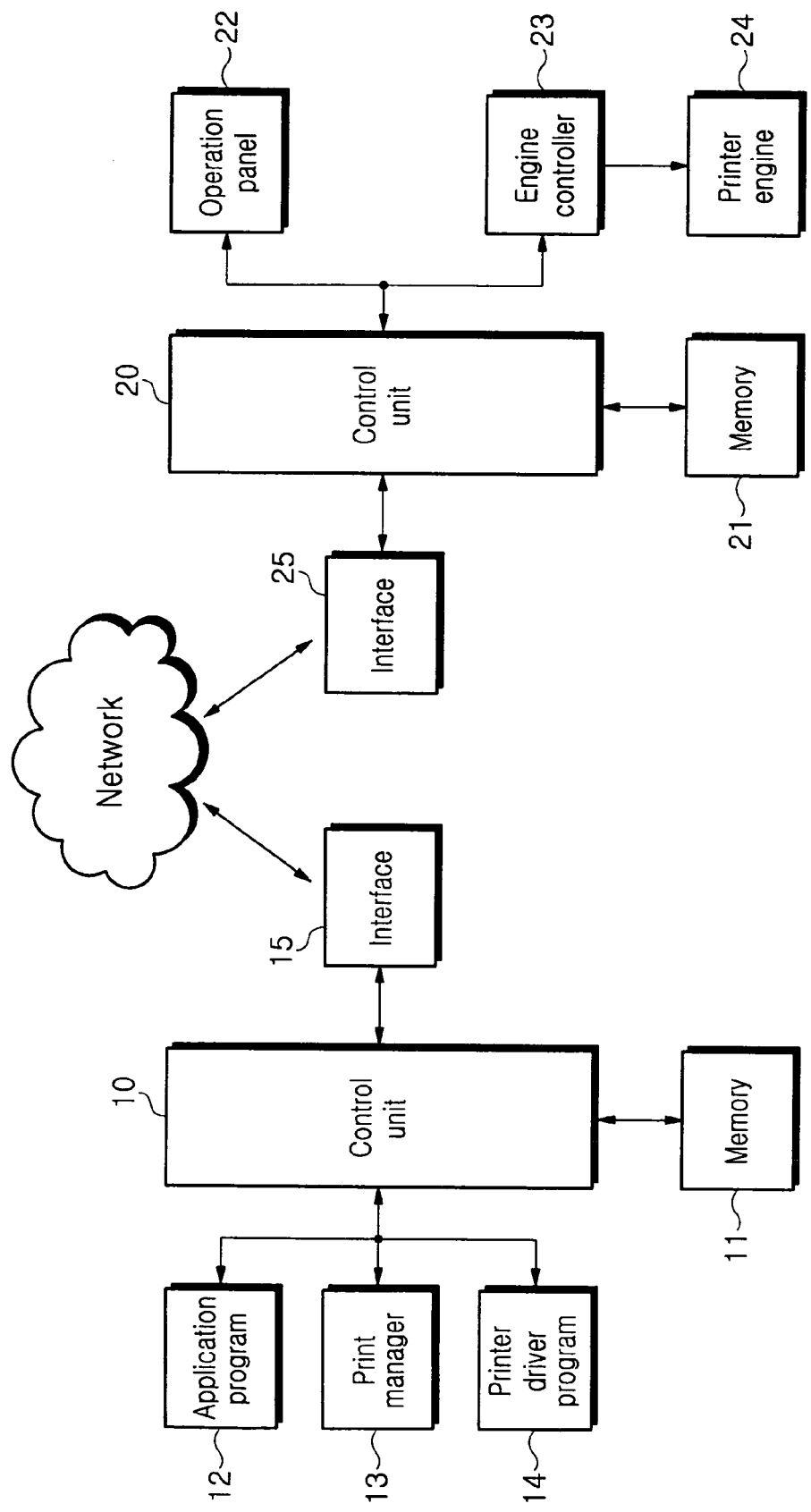
FIG. 2 is a block diagram showing the constructions of a host computer and a network printer in detail.
Figure 3:
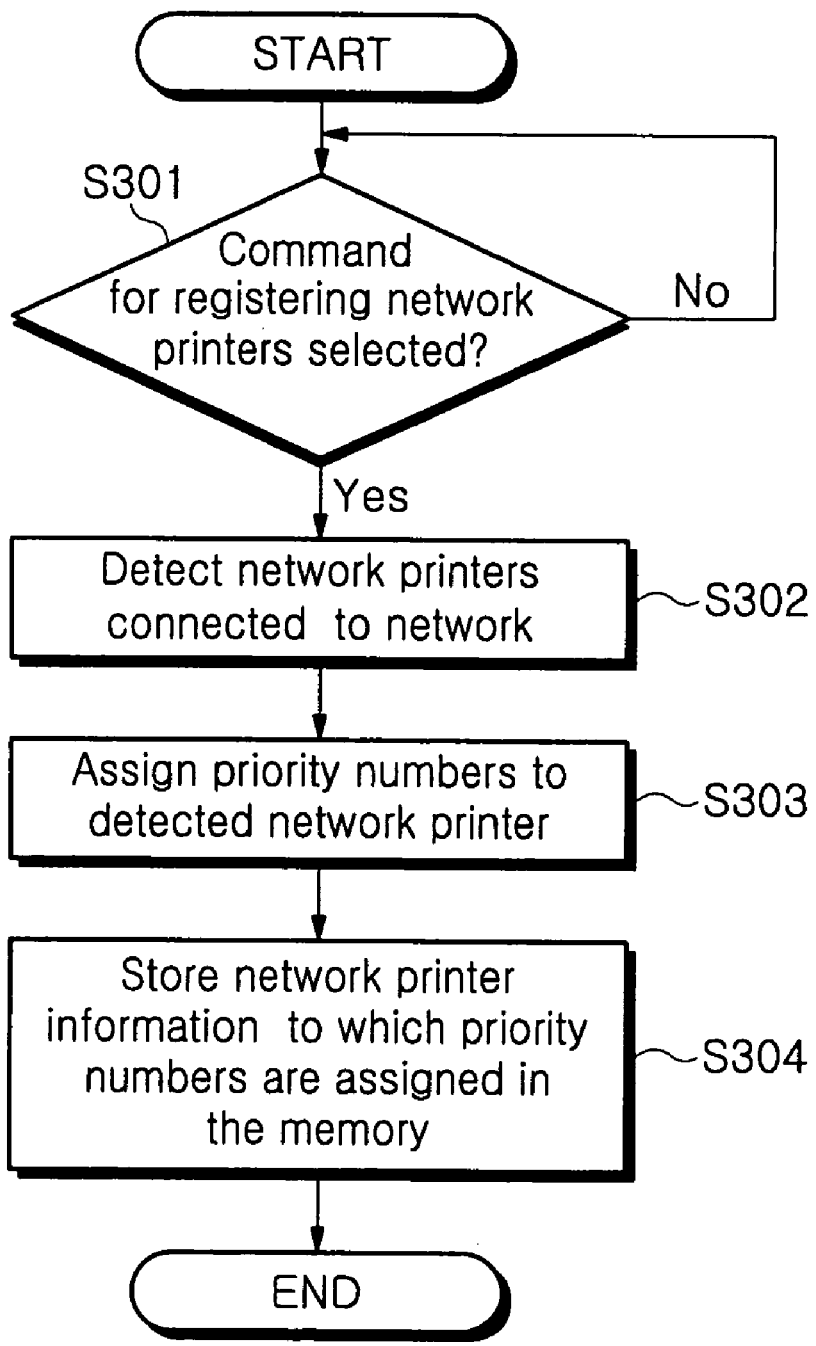
FIG. 3 is a flowchart showing a procedure for registering network printer information in the host computer.
Figures 1, 4:
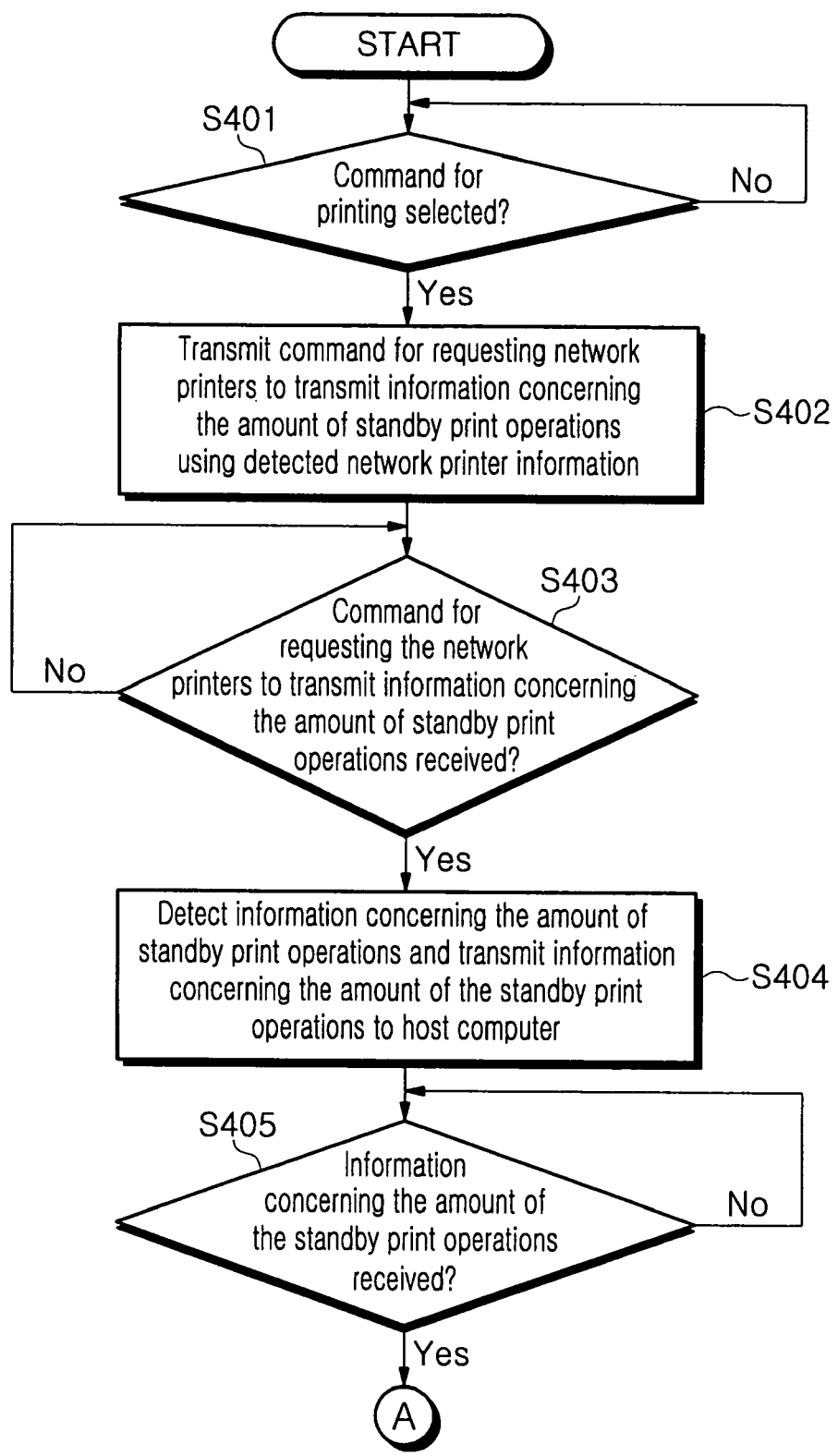
FIG. 4 is a flowchart showing a procedure for reducing standby time in accordance with an embodiment of the present invention.
Figure 4:
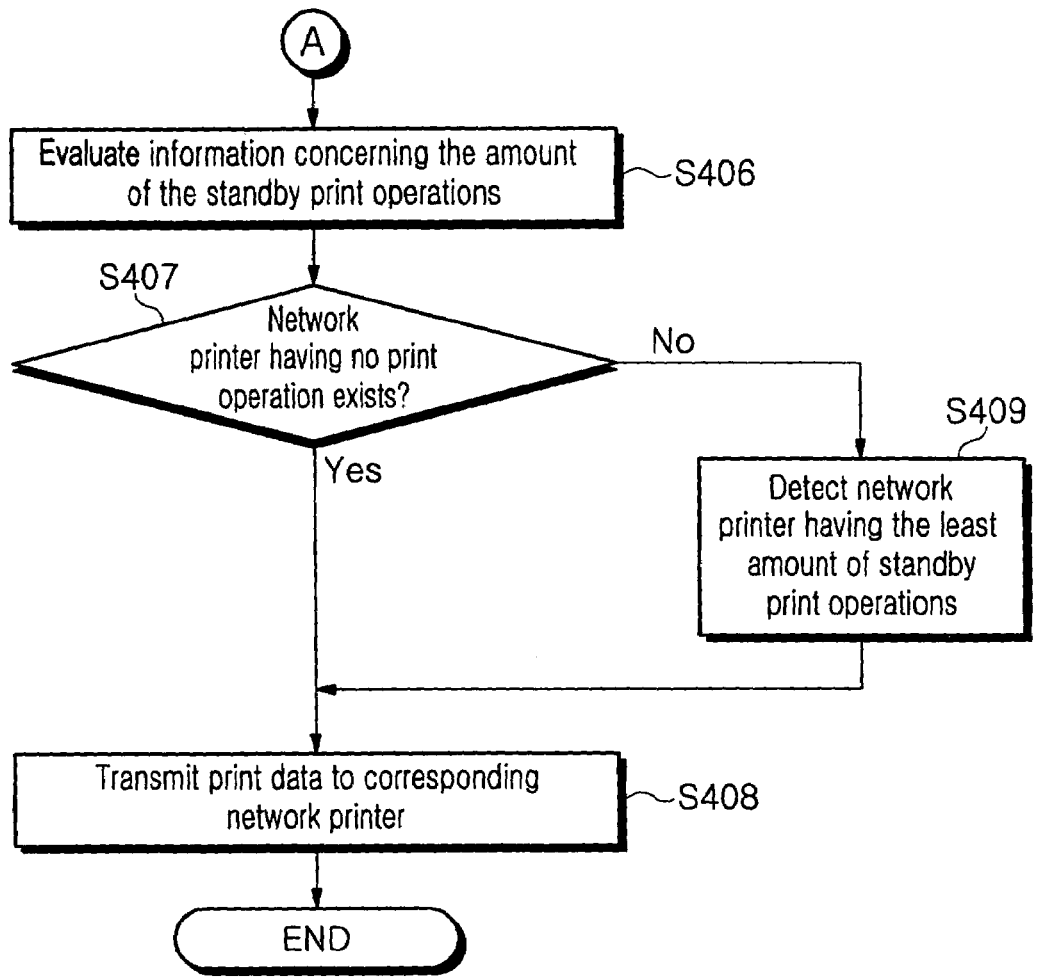
Figure 2:
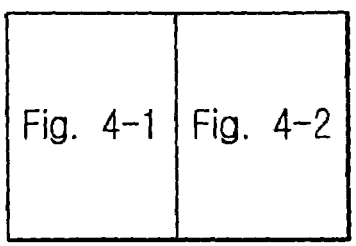

FIG. 1 is a schematic diagram in which the connection among a plurality of host computers and network printers is illustrated. FIG. 2 is a block diagram showing the constructions of a host computer and a network printer in detail. FIG. 3 is a flowchart showing a procedure for registering network printer information in the host computer. FIG. 4 is a flowchart explaining a standby time period reducing method in accordance with the present invention. FIG. 5 is a lookup table illustrating the network printer information registered in the host computer in accordance with the procedure of FIG. 3.

First of all, the connection among a plurality of host computers and network printers and the constructions of a computer and a network printer are described.

As illustrated in FIG. 1, at least one host computer 1 and two or more network printers 2 are connected to a network 3.

Referring to FIG. 2, a control unit 10 of host computer 1 controls the entire host computer. In particular, control unit 10 controls the network printer information of the network printers 2 connected to network 3 to be registered in a memory 11 (described below). Control unit 10 evaluates the information concerning the amounts of standby print operations that are received from the network printers connected to network 3, and causes the print data of host computer 1 to be finally transmitted to the proper network printer.

Memory 11 stores various programs and data processed according to the control of control unit 10 of host computer 1. In particular, the network printer information of network printers 2 that is connected to network 3 is registered in memory 11. Application program 12 is a program that is capable of making out various documents.

Print manager 13 is a program that displays various states concerning the print operation so that a user can control the print operation.

Printer driver 14 is a program that converts print data prepared in application program 12 to the data suitable for network printer 2 and transmits the converted data to network printer 2.

Interface 15 is a port for connecting host computer 1 to network 3. Interface 14 serves to transmit the data converted in printer driver 13 to network printer 2, and to input the network printer information and information concerning the amount of standby print operations received from one or more network printers to host computer 1.

Control unit 20 of network printer 2 controls the entire network printer. In particular, control unit 20 controls the information concerning the amount of standby print operations to be transmitted to host computer 1 in response to the request of the host computer 1.

Memory 21 stores various control programs required for realizing the functions of network printers 2 and data generated in the process of performing the programs, and in particular, print data that have been received from host computer 1.

Operation panel 22 comprises a plurality of keys and a display. Operation panel 22 serves to input key data, which are generated when the keys are pressed, to control unit 20 and to display the operating status of network printer 2 in accordance with the display data of control unit 20.

Engine controller 23 actuates a printer engine (described below), and transmits the print data stored in memory 21 to the printer engine, in accordance with the control of control unit 20 of network printer 2.

Printer engine 24 serves to perform the print operation using the print data transmitted from engine controller 23.

Interface 25 is a port for connecting network printer 2 to network 3. Interface 25 serves to receive print data from host computer 1 and transmit the network printer information and the information concerning the amount of standby print operations to host computer 1.

With reference to FIGS. 3 and 5, a standby time period reducing method of the present invention is described as follows.

First, a procedure for registering network printer information in the host computer is described with reference to FIG. 3. In order to register the information of one or more network printers connected to network 3 in host computer 1, a user selects a command for registering network printer information in the host computer 1, on a print operation window that is provided by printer driver 14.

Control unit 10 of host computer 1 determines whether the user has selected the command for registering network printer information in the host computer 1 (S301), and detects network printers 2 connected to network 3 (S302) if the command for registering network printer information has been selected.

Thereafter, if at least one network printer 2 connected to the network 3 is detected, control unit 10 of host computer 1 controls the information of the detected network printers to be registered in host computer 1 by storing the network printer information (for example, the type of the network printer, the port of the network printer, the Internet Protocol (IP) address of the network printer, etc.) one by one in memory 11. In such a case, control unit 10 assigns priority numbers to the network printer information in detected order (S303) and stores the network printer information, to which priority numbers are assigned, in memory 11 (S304).

After network printers 2 are registered in host computer 1, host computer 1 is capable of printing the print data via network printer 2 that permits no standby time period or a shortest standby time period to the print operation. This is described with reference to FIG. 4.

First, control unit 10 of host computer 1 determines whether the user has selected a command for printing the print data by means of network printer 2 connected to network 3 (S401).

If the command for printing has been selected, control unit 10 detects Internet Protocol (IP) addresses among one or more items of network printer information stored in memory 11 and transmits to the detected IP addresses a command for requesting network printers 2 to transmit the information concerning the amount of standby print operations (S402).

Each of control units 20 of network printers 2 corresponding to the IP addresses determines whether the command for requesting network printers 2 to transmit the information concerning the amount of standby print operations has been received (S403). If the command for requesting network printers 2 to transmit the information concerning the amount of standby print operations has been received, control unit 20 detects information concerning the amount of standby print operations, that is, the size of print data stored in memory 21 while not being printed and transmits the information concerning the amount of the standby print operations to host computer 1 (S404).

Control unit 10 of host computer 1 determines whether the information concerning the amount of the standby print operations has been received via interface 15 from at least one host computer 1 connected to network 3 (S405). If the information concerning the amount of the standby print operations has been received, control unit 10 evaluates the information concerning the amount of the standby print operations (S406). Control unit 10 determines whether there exists network printer 2 having no print operation, that is, no standby print data (S407). If there exists network printer 2 having no print operation, control unit 10 transmits print data to the corresponding network printer (S408). At this time, if the number of the network printers having no print operation is two or more, control unit 10 detects priority numbers that have been assigned in STEP S304 and transmits print data to a network printer having a preferential priority number. If network printer 2 having no print operation does not exist (NO in STEP S407), control unit 10 detects the network printer having the least amount of standby print operations among the network printers having standby print operations (S409).

Thereafter, control unit 10 of host computer 1 causes the detected network printer to perform the print operation. Therefore, the print data is transmitted to the network printer that permits a shortest standby time period to the print operation, thereby reducing the standby period for printing.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system, comprising:
    a plurality of printers operationally coupled to individually respond to instructions received via a network, each of the plurality of printers comprising a controller adapted to determine standby print information indicative of an amount of standby print operations received via the network from all of a plurality of discrete sources, a memory operatively connected to the controller, and an interface adapted to transfer data between the controller and the network; and
    a plurality of computers independently communicating by transferring data via the network, each of said computers comprising a controller, an interface adapted to transfer data between the controller and the network, and a memory individually registering network printer information representative of said plurality of printers, each controller of each of the computers being adapted to individually complete registration items of network print information by:
        accessing via the network printer information registered in the memory of in response to reception of a command for printing print-data, to directly transmit an instruction to each of the printers via the interface to command the printers to transmit standby print information via the network, from among the printers operationally coupled to the network determining on a basis of standby print information received from the printers in response to the instruction, a least used printer having a least amount of standby print operations, and
        independently of others of said plurality of computers, to initiate printing of print-data by directly transmitting the print-data via the network to the printer determined to be the least used printer.

2. The system of claim 1, comprised of each computer registering an item of the network print information in the memory of the computer by:
    determining whether a command for registering network printer information has been received;
    detecting the printers connected to the network; and
    storing the network printer information in the memory.

3. The system of claim 2, further comprised of the controller of the computer assigning priority numbers to the network printer information in order of detection and storing the priority numbers assigned in the memory of the computer.

4. The system of claim 3, comprised of each computer determining a least used printer by independently:
    detecting the priority numbers assigned to a selected number of the printers having the lowest amounts of standby print operations; and
    from among said plurality of printers, selecting a printer having a preferential priority number as the least used printer.

5. The system of claim 1, wherein the network printer information comprises an Internet Protocol address of each printer.

6. The system of claim 2, wherein the network printer information comprises an Internet Protocol address of each printer.

7. The system of claim 4, wherein the network printer information comprises an Internet Protocol address of each printer.

8. A system, comprising:
    a plurality of printers operationally coupled to individually respond to instructions received via a network, each of the plurality of printers comprising a controller adapted to accept standby print information indicative of an amount of standby print operations received via the network from all of a plurality of discrete sources, a memory operatively connected to the controller, and an interface adapted to transfer data between the controller and the network; and plurality of computers independently communicating by transferring data via the network, and independently generating print data, each of said computers comprising a controller, an interface adapted to transfer data between the controller and the network to one of the printers indicated by a selection from among said plurality of printers by the controller, each memory of each of the computers individually storing a registration of network printer information representative of said plurality of printers, and each controller of each of the computers individually responding to a print command by completing the registration by:

accessing via the network a representation of the amount of standby printer operations stored in the memory of each of the printers in response to receptions of printing print-data received from the computer and from all of the plurality of sources, from among said plurality of printers, making an determination of a printer storing a least amount of standby print operations received from the computer and from all of sources, in dependence upon the determination, making said selection of a printer, and directly transmitting print-data via the network to the one of the printers selected.

9. The system of claim 8, comprised of each computer registering an item of the network print information in the memory of the computer by:

determining whether a command for registering network printer information has been received;

detecting the printers connected to the network; and storing the network printer information in the memory.

10. The system of claim 9, further comprised of the controller of each computer assigning priority numbers to the network printer information in order of detection and storing the priority numbers assigned in the memory of the computer.

11. The system of claim 10, comprised of each computer determining a least used printer by independently:

detecting the priority numbers assigned to a selected number of the printers having the lowest amounts of standby print operations; and from among said plurality of printers, selecting a printer having a preferential priority number as the least used printer.

12. The system of claim 1, wherein the network printer information comprises an Internet Protocol address of each printer.

13. The system of claim 11, wherein the network printer information comprises an Internet Protocol address of each printer.

14. A system, comprising:

a network coupler; and a computer plug-coupleable to communicate over a network via said network coupler with a plurality of other printers accepting print data received via the network from all of a plurality of discrete sources and a plurality of other computers independently communicating by transferring data and transmitting print data to selected ones of the plurality of printers via the network, and independently generating print data, said computer comprising a controller, an interface adapted to transfer data between the controller and the network to any one of a plurality of printers coupled to the network, and a memory storing a registry of network printer information representative of the plurality of printers, said controller individually responding to a print command by completing the registration by:

compiling independently of the other computers, network printer information comprising an identification of each of the plurality of printers by accessing each of the plurality of printers via the network and storing in said memory a representation of an identification read from each of the printers, assigning priority numbers to the network printer information in order of detection and storing the priority numbers assigned in the memory, obtaining independently of the other computers, via the network a representation from each of the printers of the amount of standby printer operations stored in the a memory in response to receptions of print-data separately received via the network from the computer and from the plurality of computers, from among the plurality of printers, making an determination of a printer storing a least amount of standby print operations received via the network from the computer and from the plurality of printers, in dependence upon the priority numbers and the determination, making independently of the other computers, said selection of a printer, and directly transmitting print-data via the network to the one of the printers selected.

15. The system of claim 14, comprised of said computer registering an item of the network print information in the memory of the computer by:

determining whether a command for registering network printer information has been received;

detecting the printers connected to the network; and storing the network printer information in the memory.

16. The system of claim 14, wherein the network printer information comprises an Internet Protocol address of each printer.

* * * * *